United States Patent [19]

Brown et al.

[11] Patent Number: 4,852,680
[45] Date of Patent: Aug. 1, 1989

[54] VEHICLE ANTI-THEFT SYSTEM WITH REMOTE SECURITY MODULE

[75] Inventors: Thomas R. Brown, Plainfield, Ill.; Richard H. Logan, West Burlington, Iowa; Robert W. Hahn, Lemont; Charles D. Rodeghiero, Naperville, both of Ill.; Kevin L. Brekkestran, Fargo, N. Dak.

[73] Assignee: J. I. Case Company, Racine, Wis.

[21] Appl. No.: 178,742

[22] Filed: Apr. 7, 1988

[51] Int. Cl.$^4$ .............................................. B60R 25/00
[52] U.S. Cl. ..................................... 180/287; 307/10.2
[58] Field of Search ................... 180/287; 307/10 AT; 340/63; 70/243

[56] References Cited

U.S. PATENT DOCUMENTS

| | | | |
|---|---|---|---|
| 3,619,633 | 1/1970 | Brandon | 307/10 AT |
| 3,670,836 | 7/1970 | Tonkowich et al. | 70/57 |
| 3,731,156 | 5/1971 | Watson | 317/134 |
| 3,756,341 | 7/1971 | Tonkowich et al. | 307/10 AT |
| 3,907,060 | 1/1974 | Burton et al. | 307/10 AT |
| 3,968,666 | 11/1974 | MacKinnon | 70/243 |
| 4,232,758 | 4/1978 | Crosas | 180/287 |
| 4,292,620 | 6/1979 | Pagane | 340/63 |
| 4,360,074 | 11/1982 | Parquet | 180/287 |
| 4,463,340 | 7/1984 | Adkins et al. | 180/287 |
| 4,690,240 | 9/1987 | Russo | 180/287 |
| 4,691,801 | 3/1986 | Mann et al. | 180/287 |

OTHER PUBLICATIONS

Machine Design Magazine, p. 36, Jul. 10, 1986.
Application Note AN17, Signetics Programmable Logic Data Manual, 1986, pp. 9-107 through 9-109 (Jan. 1986).

Primary Examiner—Charles A. Marmor
Assistant Examiner—Ross Weaver
Attorney, Agent, or Firm—Dykema Gossett

[57] ABSTRACT

An anti-theft security system for an off-road vehicle is disclosed. The system includes a master control module, which may be part of the vehicle's instrument cluster, and a remotely located security module, which is directly adjacent to at least one electrically-operated actuator of the vehicle normally operated as part of transporting the vehicle to another location. The security module includes a tamper-resistant housing which obstructs physical access to at least part of the actuator. The master module, which may include a microprocessor and LED display, has an operator interface such as a keypad for entering a first access code known only to authorized operators of the vehicle. When the sequence of entered keystrokes matches the first access code stored within the master module, the module automatically generates and transmits to the security module a signal containing a second and different access code. When the security module determines that the received signal is coded with the same second access code stored within its memory, a power switch within the security module is energized, thereby providing electrical power to the actuator so that the vehicle may be moved. The second access code contained in the signal transmitted between modules may be an analog signal encoded by using a special voltage, frequency or waveform, or a serial digital signal encoded with a multi-bit code. To further improve security, the master module is arranged to allow the first access code stored therein to be reprogrammed when a special sequence of keystrokes is entered.

4 Claims, 6 Drawing Sheets

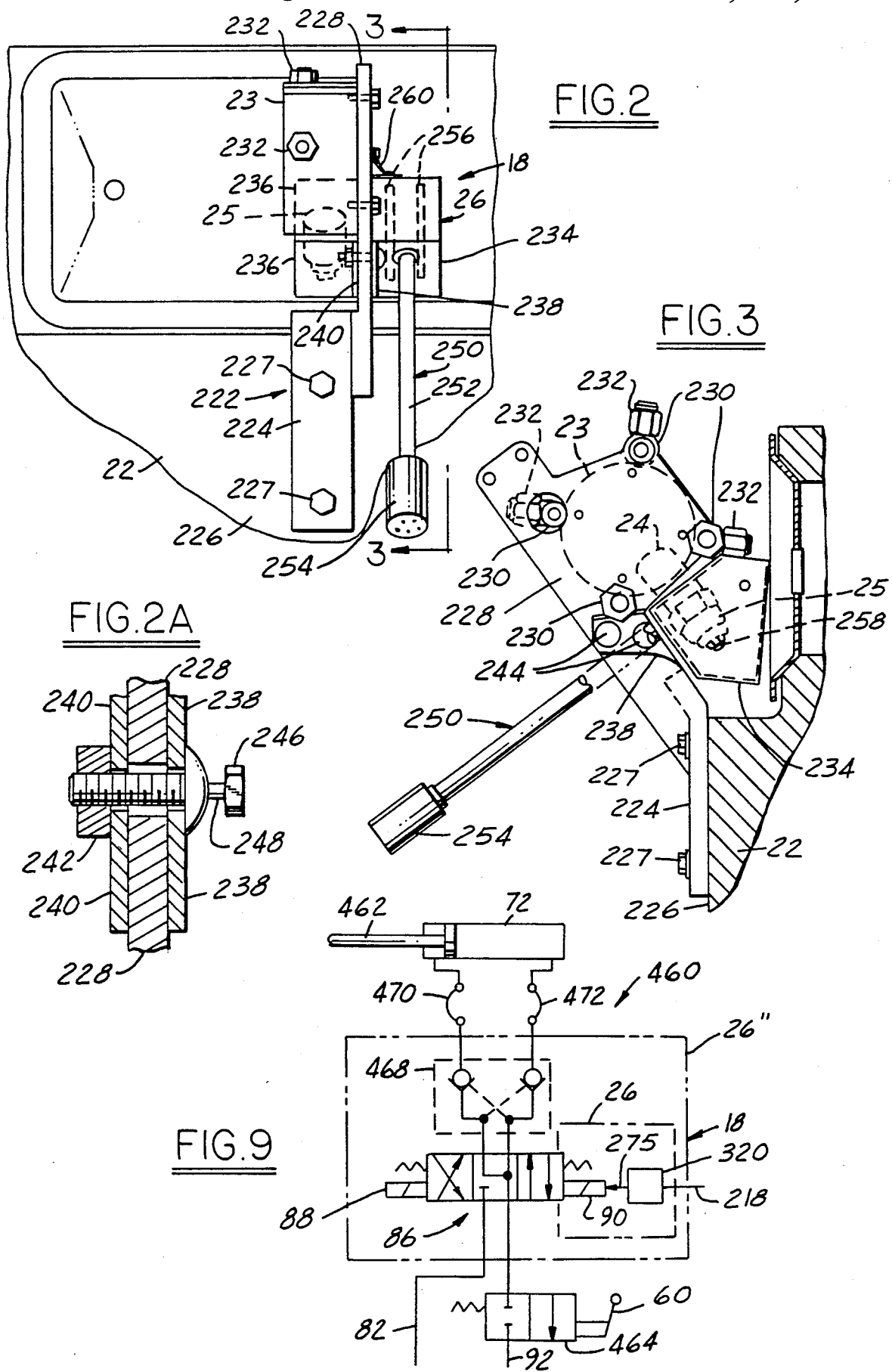

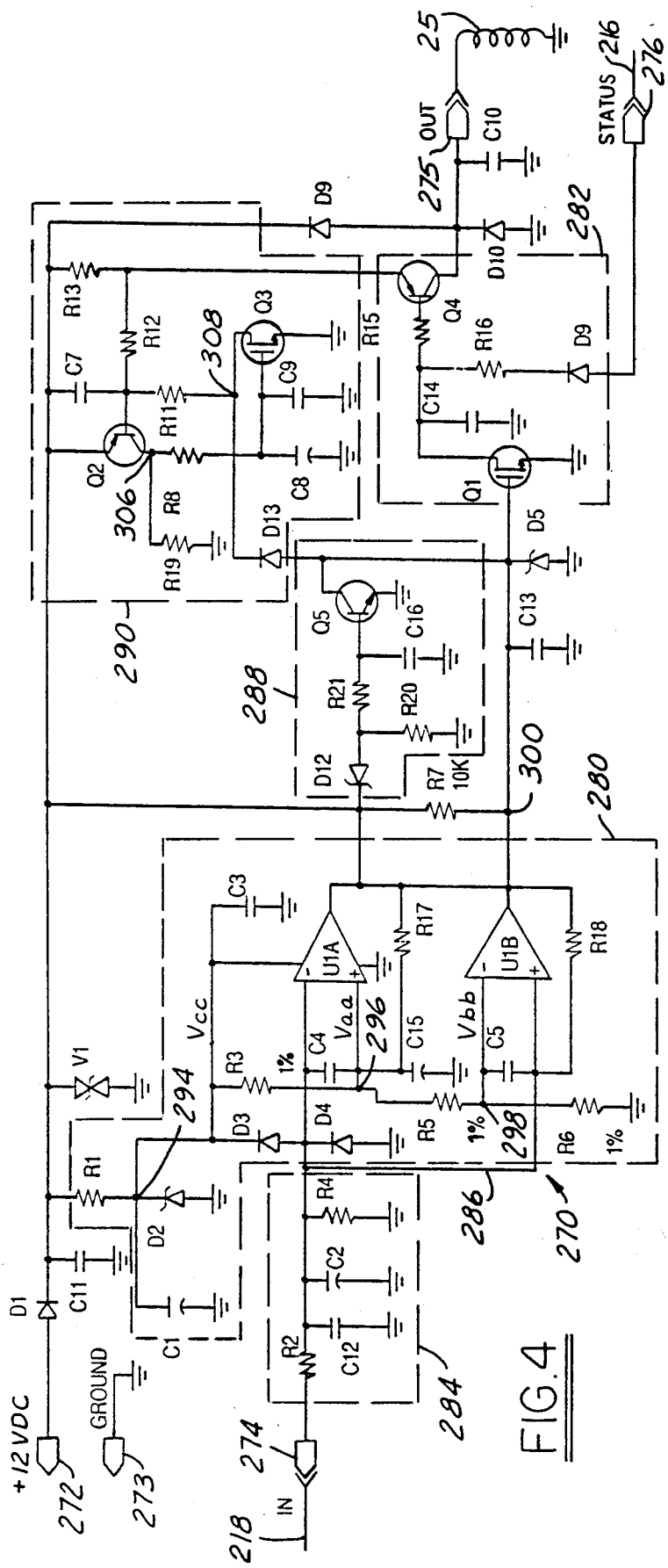
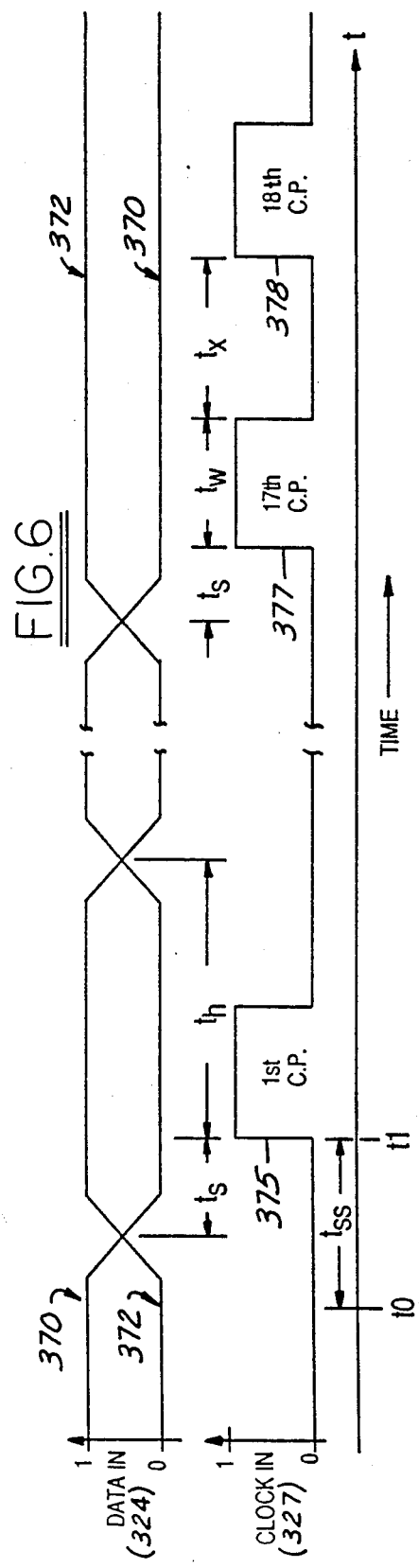
FIG. 4
FIG. 6

VEHICLE ANTI-THEFT SYSTEM WITH REMOTE SECURITY MODULE

BACKGROUND OF THE INVENTION

1. Field of the Invention

The invention relates in general to vehicle anti-theft security systems which operate by controlling when at least one electrically-operated actuator on the vehicle may be operated, and in particular to anti-theft systems for off-road vehicles employing access codes and electrical circuits for recognizing such codes.

2. Discussion

Self-powered vehicles used in the construction and agricultural industries, which often are very expensive, are subject to theft and operation by unauthorized persons, just like conventional highway vehicles, i.e., cars and trucks. Yet, providing adequate security systems to deter theft or unauthorized operation of off-road vehicles poses special problems not normally associated with cars or trucks. Cars and trucks are traditionally designed and built to have lockable operator and engine compartments; deterrents against theft can therefore be achieved through security systems which keep unauthorized persons out of the operator and engine compartments. In contrast, construction vehicles and many agricultural vehicles are often built with operator compartments which are not lockable or otherwise easily secured against unauthorized entry.

Unlike most highway vehicles, which typically are only operated by one or a few individuals over a lengthy period of time, self-powered construction equipment and certain types of agricultural equipment are often operated by many persons, especially when the equipment is frequently moved between work sites. Workers in the construction and agricultural fields are often employed on a short-term basis and tend to change employers frequently, which compounds the difficulty of maintaining vehicle security.

Key-operated ignition switches provided on most off-road vehicles do not by themselves always provide adequate security. Keys can be duplicated or stolen. The locks into which the keys fit can be picked or smashed. Also, a thief can "hot-wire" the vehicle, thus bypassing the ignition key altogether. Hidden "kill" switches wired in series with a normal key-operated ignition switch can also be provided to deter the amateur thief or unauthorized user. The professional thief, however, makes it his business to learn how to locate and defeat kill switches or other such devices or bypass them, along with the normal ignition switch, when hot-wiring a vehicle. Moreover, when many different people operate a vehicle, the location of the hidden device does not remain a well-kept secret. Even repair shop personnel are told how to defeat the security system so that they can test the vehicle after the repairs they are making are complete. Also, such hidden devices cannot be installed as economically by the vehicle manufacturer as original equipment, since the location of the hidden devices must be varied from unit to unit of the same type of vehicle.

The problems mentioned in the foregoing paragraph are also present in cars and trucks. A number of different security systems for cars and trucks have been developed to overcome them as disclosed, for example, in the following U.S. patents:

| U.S. Pat. No. | Inventor |
|---|---|
| 3,619,633 | Brandon |
| 3,670,836 | Tonkowich et al. |
| 3,731,156 | Watson |
| 3,756,341 | Tonkowich et al. |
| 3,907,060 | Burton et al. |
| 4,232,758 | Crosas |
| 4,691,801 | Mann et al. |

The first four patents listed above disclose security systems which have various means for physically protecting control circuitry in an electrically operated actuator of a vehicle operated by that circuitry against tampering or being easily bypassed. The techniques disclosed include: (1) placing coding switches, control relays and an ignition coil inside a locked steel box; (2) placing an epoxy-encapsulated circuit and solenoid for a fuel shut-off valve inside a hardened metal casing locked to the vehicle's carburetor; and (3) placing decoding circuitry and a solenoid-operated fuel shut-off valve inside a sturdy weather-proof box.

All of the foregoing patents also disclose security systems which intentionally employ coded signals or access codes to make it more difficult to defeat the disclosed system. In the Brandon patent, the disclosed security system employs two sets of changeable coding switches in a locked box that determine which two of eight pushbuttons on an operator panel on the dashboard must be depressed in order to disarm the security system so that the vehicle may be operated. The security systems disclosed in the two Tonkowich et al. patents, the Watson et al. patent, and the Crosas patent also employ multiple pushbuttons or switches on an operator's panel for entering an access code. In most of the vehicle security systems disclosed in these four patents, the buttons or switches must also be actuated by the vehicle operator in a predetermined sequence. Failure to enter the correct access code and/or sequence results typically in the electrical circuitry of the security system entering a latched-up state so that further attempts to disarm the system cannot be made until power is removed from the system. In the security systems disclosed in the Burton et al. patent and the Mann et al. patent, the coded signals are transmitted by use of radiowave or infrared beam to a receiver located on the vehicle.

One problem with those security systems disclosed in the aforementioned patents which employ circuitry in an enclosure located at the electrically-operated actuator is that a multiple conductor interconnection is required to communicate coded information between the operator's panel and the enclosure. The Tonkowich et al. systems use a special "tamper-proof" cable having multiple dummy conductors and other special features through which a full-voltage electrical signal is sent to energize a solenoid in a hardened casing. However, special cables or wiring harnesses having multiple conductors for passing information between two well-separated locations on a vehicle add to the cost and tend to reduce the long-term reliability of the electrically-operated security systems. Using fewer conductors to pass such information is therefore desirable.

Another shortcoming of the aforementioned security systems is that each system uses only one access code which cannot be readily changed by the operator or owner of the vehicle. Where there are many operators or other personnel who over time learn the access code for the vehicle, this greatly dilutes the integrity of such vehicle security systems. If the vehicle owner cannot change the code himself, he has no way to protect against the dishonest employee or the suspicious repairman who has leaned the access code. In time, the owner may not even be sure how many people know the code, since some individuals may learn the code through an overheard conversation or breach of security procedures.

Another criterion for evaluating the effectiveness of a vehicle security system is how long it takes the average thief to defeat or bypass it. The longer it takes a thief to defeat a security system, the more likely it is that the thief will abandon his efforts to steal the vehicle or not even bother with attempting to steal it. The longer a thief must work to defeat a security system, the greater is the risk that his unauthorized presence and criminal activity will be detected. Thus, it is desirable to provide a security system which is difficult and time-consuming to defeat or bypass.

However, an anti-theft security system should be easy, not difficult, for an authorized user to disarm, so that the vehicle can be used. The security system should not be prohibitively expensive or significantly interfere with the ability to perform routine maintenance required to keep the vehicle in service. In this regard, it is desirable to use a minimum number of conductors for passing coded information and to use commonly available cables or wires to interconnect the vehicle's master control panel and operator interface with a remotely located security module. This will help reduce the original cost of the system and the cost of servicing and replacing such wiring should that be necessary.

In light of the foregoing problems and desires, it is an object of the present invention to provide an anti-theft security system for an off-road vehicle that controls when an electrically-operated actuator on the vehicle may be operated, has few or none of the aforementioned shortcomings, and has virtually all of the aforementioned desirable attributes, including having an access code which can be readily changed by the vehicle operator or owner.

Other objects of the present invention include providing a vehicle security system that (1) is economical, reliable, and easy for an authorized user to disarm, while being difficult and time-consuming for a thief or other unauthorized user to defeat or bypass; (2) has a master control module with operator interface, preferably including a keypad and digital display, formed as part of the instrument cluster of the vehicle; (3) has a remotely located security module provided with a tamper-resistant housing enclosing decoding circuitry and an electrically-operated actuator such as a solenoid located therein; (4) employs two distinct access codes, one which the vehicle operator knows and enters to disarm the system, and another unknown to the vehicle operator and which is encoded in the signal sent between the master control module and the remote security module; (5) uses one or two conductors for sending a coded signal between the master module and the remote control module; (6) employs a sophisticated analog or serial digit encoding technique for encrypting the code in the signal between the master module and the remote module; and (7) provides electronic circuitry in the remote module for preventing damage that might be caused by accidental or deliberate over-voltage, short-circuiting, or transient electrical noise conditions, and for monitoring the internal status of the remote module for diagnostic purposes.

SUMMARY OF THE INVENTION

In light of the foregoing problems and objects, there is provided, according to a first aspect of the present invention, in an off-road vehicle, an anti-theft system which controls when at least one electrically-operated actuator on the vehicle may be operated. The system comprises: a master control module including operator input means for entering a sequence of first signals from an operator of the vehicle; means for determining whether the entered sequence of first signals matches the first template in the master control module; means for automatically generating a second signal for transmission to a remote location when the entered sequence of first signals matches the first template; and security module means at a location remote from the master control module and directly adjacent to the one electrically-operated actuator for protecting the actuator against unauthorized operation. The security module means includes signal input means for receiving the second signal from the master control module, means for determining whether the receiving second signal includes a predetermined identifying characteristic indicating that vehicle operation is authorized, and means for providing an electrical signal to the actuator to operate the actuator when the received second signal includes the first predetermined identifying characteristic. The operator input means preferably includes a keypad having a plurality of keys, which may be alphabetic, numeric or other symbolic characters, and the sequence of first signals is preferably a sequence of at least three keystrokes on the keypad. The means for determining whether the entered sequence of first signals matches the first template preferably includes memory means for storing a sequence of at least three characters corresponding to three predetermined keystrokes. The second signal preferably includes at least eight bits of information encoded therein.

The electrically-operated actuator may be any device on the vehicle which may be utilized to prevent unauthorized movement of the vehicle. For example, the actuator may be a solenoid-operated shut-off valve in the fuel delivery subsystem of the vehicle, a motor or solenoid-operator actuator in the transmission control subsystem, a solenoid-operated directional valve in a vehicle-stabilizing system, or an electrical component of the vehicle's ignition system, such as a solid-state power switch feeding battery power to the ignition coil.

According to a second aspect of the present invention, there is provided a security system for preventing unauthorized movement of an off-road vehicle by controlling when at least one electrically-operated actuator on the vehicle may be operated. This system comprises an instrument cluster including (1) memory means for storing a sequence of characters representing a first access code known to an authorized vehicle operator, (2) keypad means for enabling the authorized vehicle operator to enter a first sequence of keystrokes corresponding to the first access code, (3) means for determining whether the entered sequence of keystrokes matches the first access code stored within the memory means, and (4) means for automatically generating, when the entered sequence of keystrokes matches the first access code, an electrical signal encoded with a second access code distinct from the first access code as part of enabling the operation of the actuator. The system also comprises security means, located remotely from the instrument cluster and at the actuator, for protecting the actuator against unauthorized operation. The security means includes (1) tamper-resistant housing means for obstructing physical access to at least part of the actuator, (2) memory means for storing the second access code within the security means, (3) signal input means for receiving the electrical signal from the instrument cluster, (4) means for determining whether the received electrical signal is encoded with the second access code, and (5) means for providing an electric signal to the actuator to operate the actuator when the received electrical signal is so encoded. The received electrical signal may be an analog signal encoded with at least one distinctive identifying characteristic, such as a predetermined voltage level which may be between a supply voltage level and ground, a predetermined frequency, or a predetermined waveform. However, the received electrical signal is preferably a serial digital data signal encoded with at least eight bits of information, in order to provide an increased level of security.

According to a third aspect of the invention, there is provided a control module for use in a security system of an off-road vehicle. As before, the security system is to prevent unauthorized movement of the vehicle by controlling when at least one electrically-operated actuator on the vehicle may be operated. The control module comprises: barrier means, located adjacent to at least one electrically-operated actuator on the vehicle, for deterring unauthorized physical access to the actuator; means for receiving over a single line a coded signal; electronic means for determining whether the received coded signal includes a predetermined identifying characteristic whose presence in the received signal indicates that an authorized operator wishes to operate the actuator; and means for providing an electrical signal to the actuator when the received coded signal includes a first predetermined identifying characteristic. The barrier means preferably includes a tamper-resistant housing substantially enclosing the aforementioned other means of the control module.

According to a fourth aspect of the invention, there is provided in a security system for an off-road vehicle a module for selectively enabling an electricallyoperated actuator of the vehicle. The module helps prevent unauthorized movement of the vehicle by controlling when the actuator on the vehicle may be operated. The module is responsive to a predetermined coded signal generated by another electronic apparatus on the vehicle and comprises: housing means obstructing physical access to at least part of the actuator so as to prevent unauthorized operation of the actuator; and electronic circuitry located within the housing means for controlling the operation of the module. The circuitry includes: (1) means for storing an access value within the module; (2) means for receiving the coded signal over no more than two conductors; (3) means for determining whether the received coded signal is encoded with the access code value; and (4) means for providing an electrical signal to the actuator to operate the actuator when the receive signal is encoded with the access value. The coded signal is preferably a synchronous serial digital signal, and the electronic circuitry preferably further comprises means for receiving a clock signal along with the coded signal to permit clocked operation of at least part of the electronic circuitry.

According to a fifth aspect of the present invention, there is provided a method implementing a security system for an off-road vehicle. The method comprises the steps of: (a) providing a system control module including an operator interface at a first location on the vehicle and a security module at a second location on the vehicle distinct from the first location and adjacent to an electrical actuating means for operating a portion of the vehicle normally operated when the vehicle is to be moved; (b) transmitting over no more than two lines a coded signal from the system control module to the security module; (c) determining with electronic means located within the security module whether the transmitted coded signal received by the security module matches a predetermined value stored within the security module; and (d) allowing the electrical actuating means to be operated only after a tranmsitted coded signal has matched the predetermined stored value. Preferably, the method further comprises the step of arranged the electronic means within the security module so that the electrical actuating means cannot be operated when the transmitted coded signal fails to match the predetermined stored value within the security module, until the electrical power to the security module has been removed for at least a predetermined period of time. The method also preferably further comprises the step of requiring a security code which matches a predetermined security code stored within the system control module to be entered in the operator interface by a vehicle operator before the system control module transmits the coded signal; and provided means for allowing an authorized person entering the correct sequence of command signals into the operator interface to change the predetermined security code without changing the coded signal required to operate the remote security module.

According to a sixth aspect of the invention, there is provided a method of implementing a security system in an off-road vehicle, comprising the steps of: (a) providing an electronic controller including an operator interface at a first location within the operator compartment of the vehicle, and a control module at a second location of the vehicle remote from the first location and adjacent to an electrical actuating means for operating the portion of the vehicle normally operated when the vehicle is to be moved; (b) providing as part of the operator interface a keypad having a plurality of keys to allow an operator of a vehicle to enter a sequence of keystrokes; (c) providing, as part of the electronic controller, non-volatile memory means for storing of a predetermined access code and means for determining whether an entered sequence of keystrokes matches the predetermined access code; (d) when the entered sequence of keystrokes matches the predetermined access code stored within the memory means, sending a separate coded signal distinct from the access code and unknown to the operator of the vehicle to the control module; (e) providing, as part of the control module, electronic circuitry for examining the coded signal transmitted by the electronic controller to determine if information encoded therein matches a predetermined value permanently provided within the electronic circuitry; and (f) enabling an electrical signal to be provided to the electrical actuating means only when the information encoded within the transmitted coded signal matches the predetermined value within the control module.

These and other aspects, objects, features, and advantages of the present invention will become readily apparent from the following detailed description, accompanying drawings, and appended claims.

BRIEF DESCRIPTION OF THE DRAWINGS

In the accompanying Figures where like items and features are identified by identical reference numerals in the various Figures:

FIG. 2 is a side elevational view of the FIG. 1 security module of the present invention and fuel injection pump attached to the fuel injection pump mounting bracket extending from the internal combustion engine of the FIG. 1 vehicle, illustrating how the tamper-resistant housing of the security module shrouds the fuel shut-off valve solenoid;

FIG. 2A is an enlarged fragmentary view of a portion of FIG. 2 illustrating the screw and nut arrangement used to secure the housing sections of the security module to the pump mounting bracket;

FIG. 3 is an end view of the security module, fuel injection pump and mounting bracket shown in FIG. 2, taken along line 3—3 of FIG. 2;

FIG. 4 is a schematic diagram of the electronic circuit for an analog security module that requires a specific analog input signal to energize its output;

FIG. 6 is a timing diagram to help explain the operation of the anti-theft system of the present invention implemented with the digital security module whose circuit is illustrated in FIG. 5;

DETAILED DESCRIPTION OF THE PREFERRED EMBODIMENTS

Figure 1:
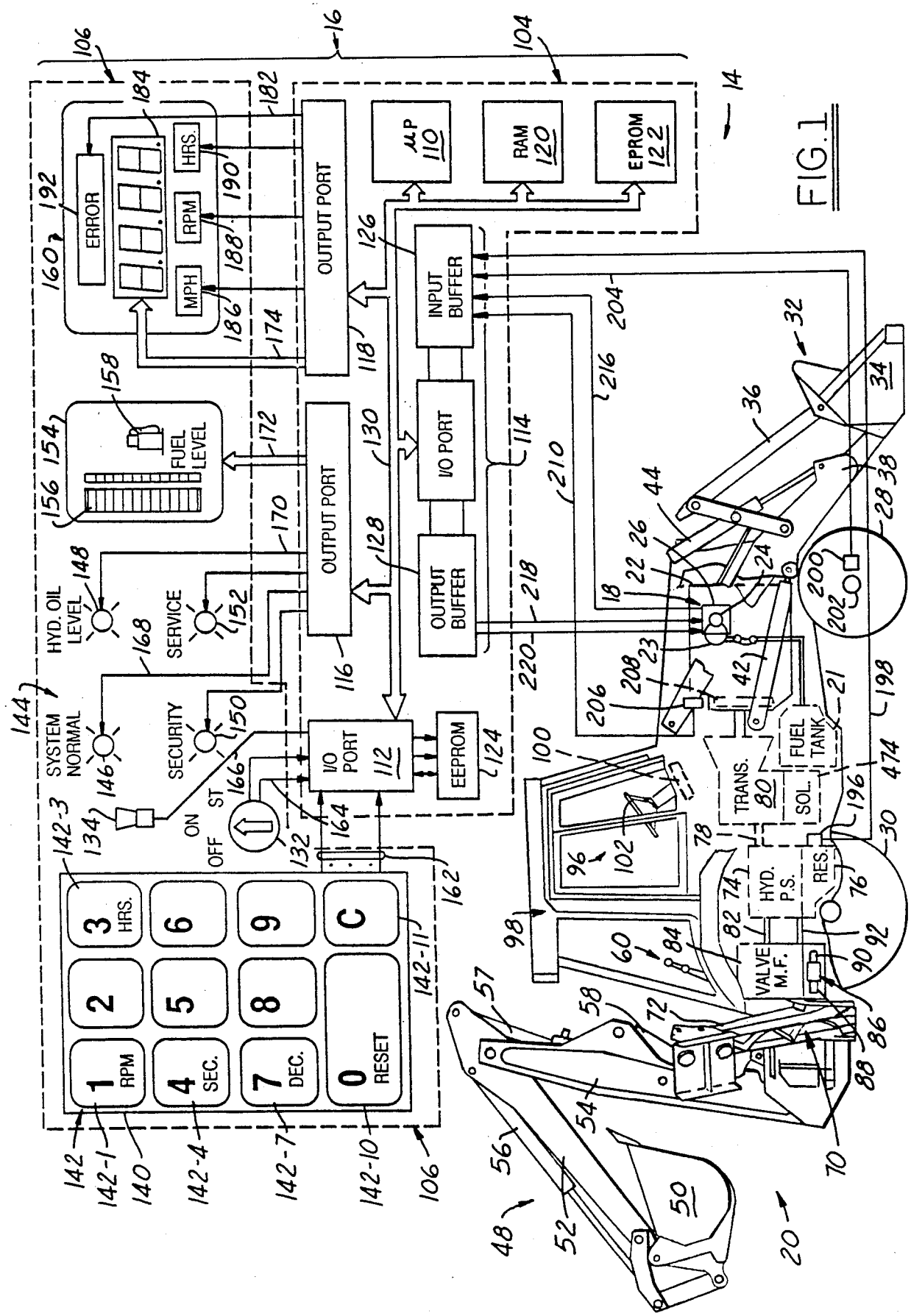
FIG. 1 is a combination diagram illustrating one embodiment of the vehicle anti-theft system of the present invention installed in an off-road vehicle, namely, a loader/backhoe, shown in simplified form in side elevation, with the anti-theft system including a master control module provided with an operator interface panel shown in simplified plan view as part of the vehicle's instrument cluster and microcomputer system shown in block diagram form, and a security module shown as a box-like housing constructed about the shut-off valve solenoid of the vehicle's fuel injection pump, with all of the modules being interconnected as shown.

Referring now to FIG. 1, an anti-theft security system 14, comprised of a master control module 16 and a security module 18 located remotely from module 16 is installed on an exemplary off-road vehicle, namely a front-end loader/backhoe 20. The vehicle 20 includes a fuel tank 21 and an internal combustion engine 22, such as a four-cylinder diesel engine. The engine 22 has a conventional fuel injection pump 23 with a normally closed, spring-returned fuel shut-off valve 24 enclosed by security module 18 which includes a tamper-resistant housing 26 which will be further described. The vehicle 20 also includes a front pair of steerable wheels 28, a rear pair of driven wheels 30, and a conventional or suitable front-end loader structure 32 including a bucket 34, bucket support arms 36, lift arms 38, lift cylinder 42, and bucket tilt cylinder 44. The vehicle 20 further includes a conventional backhoe structure 48 including bucket 50, outer and inner arm members 52 and 54, and hydraulic cylinders 56, 57 and 58, operated in conventional or suitable fashion by hydraulic operator control levers 60. The vehicle 20 also includes a vehicle-stabilizing subsystem including a pair of stabilizers or outriggers such as stabilizer 70, operated by hydraulic cylinders, such as cylinder 72, for providing additional lateral support when using the backhoe 48.

The vehicle 20 also includes a conventional hydraulic power supply 74 having a hydraulic fluid reservoir 76. The hydraulic power supply 74 is powered via a power take-off shaft 78 of the vehicle's transmission 80. Pressurized hydraulic fluid is provided by hydraulic conduit 82 to a conventional hydraulic valve stack or manifold 84 which includes various directional control valves, pressure regulators and flow control valves for operating various hydraulic actuators on the vehicle in conventional manner. For example, solenoid-operated directional control valve 86 may be provided to control the raising and lowering of the stabilizer 70 by diverting fluid to and from hydraulic cylinder 72. Lower solenoid 88 and raise solenoid 90 are provided on valve 86 so that the lower and raise commands can be performed under control of an electrical actuator, namely the solenoids. Hydraulic conduit 92 is a return line from the valve stack and manifold 84 to the reservoir 76. The vehicle 20 also has an operator's compartment 96 enclosed by cab structure 98. An instrument cluster 100 is located in the front dashboard area of the operator's compartment 96 in the vicinity of steering wheel 102.

The Master Control Module

The master control module 16 of the security system of the present invention is preferably constructed as part of the vehicle's instrument panel or cluster 100. The module 16 may be considered an electronic controller constructed about and operated by a microcomputer system 104, indicated in dashed lines, which has an operator interface or annunciator panel 106, also indicated by dashed lines, interconnected to the microcomputer 104. Both the microcomputer 104 and the operator interface 106 may be constructed and housed within the instrument cluster 100. The microcomputer system 104 is preferably of conventional design and includes a microprocessor 110, one or more buffered I/O ports, such as ports 112, 114, 116 and 118, random access memory (RAM) 120, an ultraviolet-light erasable, programmable read-only memory (EPROM) 122, and an electrically erasable, programmable read-only memory (EEPROM) 124 for storing data to be retained during power-down situations. The buffered I/O ports may include conventional signal-conditioning and isolation circuitry such as noise suppression devices, power drivers, opto-isolators and the like or a digital-to-analog converter. Such circuitry is shown as separate input and output buffers, such as buffers 126 and 128 for I/O port 114. The blocks 110 through 122 are interconnected by a suitable bus 130 having multiple conductors for simultaneously carrying data, address and control signal information between the blocks, in a manner well understood by those in the microprocessor art. Those in such art will recognize that any suitable microprocessor and associated support chips from a variety of different manufacturers in a variety of conventional configurations for implementing the microcomputer system 104. One suitable microprocessor is the Motorola Model MC6802 which includes within it RAM 120. Further details of the implementation of a micro-processor-based electronic controller using the foregoing Motorola microprocessor and various Motorola support chips is provided in commonly assigned copending U.S. patent application Ser. No. 055.820, filed May 29, 1987 in the names of K.L. Brekkestran and J.C. Thomas and entitled "Electronic Control System for Powershift Transmission," the disclosure of which is hereby incorporated by reference. Alternatively, the controller 104 and operator interface 106 may be custom-ordered from a company in the business of producing microprocessor-based instrument clusters according to the customer's specifications, such as the DICKEY-john Company of Auburn, Ill.

The operator interface 106 preferably includes a conventional ignition switch 132 having at least three positions, namely OFF, ON and ST (start), which respectively are used to turn off, enable the operation of, and initiate the starting of engine 22 of vehicle 20. A conventional audible alarm, such as small horn 134, is preferably provided in panel 106 to alert the operator of the vehicle 20 to various conditions. The operator interface 106 also includes a keypad 140 having a group 142 of eleven keys or switches 142-1 through 142-11 labeled "1" through "9", "0" and "C". A set 144 of pilot lights 146-152, one or more conventional bar graphs such as LED bar graph 154 having twelve individual LED segments 156 for displaying a given vehicle parameter indicated by the adjacent legend and symbol 158, such as fuel level, and a visual display 160, all connected in conventional fashion to microcomputer system 104 by suitable conductors represented by signal paths 162-182, as shown. The switches 142 of keypad 140 may be of any suitable type used on computer keyboards or electronic calculators, such as the membrane switch type. The various keys may be provided with more than one legend, as illustrated by keys 142-1, 142-3, 142-4, 142-7 and 142-10 which respectively include legends RPM (revolutions per minute), HRS(hours), SEC(security), DEC(decode), and RESET. Pilot lights may be used to indicate various aspects of the status of vehicle 20 as illustrated by exemplary lights 146, 148, 150 and 152 respectively having legends System Normal, Hydraulic Oil Level, Security, and Service. The instrument cluster may include additional pilot lights for other vehicle conditions, such as parking brake on, engine oil pressure low, alternator voltage low, ail filter dirty, and the like, and additional bar graphs for coolant temperature, electrical system voltage and the like, if desired. Such lights and bar graphs may all be operated by microcomputer 104.

The visual display 160 may include a character display of the alphanumeric or numeric-only LED or LCD type, such as the four-digit seven-segment with decimal point LED display 184 shown. Display 186 may be used to display messages and values regarding the status of the vehicle, including desired and actual vehicle parameter values as monitored by the microcomputer system 104, and access codes and messages used in conjunction with the security system. The data or signal paths 172 and 174 for driving the LED graph 154 and the seven-segment display 184 may include multiple conductors. The display 160 may also include back-lit message indicators such as indicators 186, 188, 190 and 192 respectively having legends MPH, RPM, HRS, and ERROR. The legends 186-192 may be selectively illuminated in conjunction with parameter values, error codes, and other indications of the status of the vehicle 20 or the security system 14.

Conventional transducers and wiring connections may be provided on the vehicle 20 in order to supply the microcomputer system 104 with the information it needs to drive the pilot light set 144, the fuel level graph 154, the visual display 160, and any other lights or displays included in the instrument cluster 100. For example, liquid level transducer 196 provides a signal over conductor or signal path 198 that the hydraulic oil level in reservoir 76 is acceptable. When the oil level is low, the signal on path 198 is absent, and computer 104 turns on pilot light 148. Speed transducer 200 detects the passage of individual teeth of a multiple-tooth gear (not shown) mounted on the axle 202 of front wheels 28, which indicates the rate of rotation of the axle 202, thus providing a ground speed signal on signal path 204. A similar magnetic pick-up device 206 is used to monitor the rotation of the flywheel 208 of the engine 22, thus providing an input signal on signal path 210. The signals on paths 204 and 210 may take the form of an analog signal or a digital signal whose frequency or period varies in accordance with the rate of rotation of the gear or flywheel being monitored, and these input signals can be converted to ground speed and engine speed values for display on seven-segment display 184, with the appropriate legend 186 or 188 being illuminated at the same time a particular value is displayed.

The Service pilot light 152, the HRS key 142-3, and the HRS legend 190 may be used to provide indications of when the vehicle should be taken to a repair shop for routine maintenance. For example, when the HRS button 142-3 is pressed, the microcomputer 104 can be programmed to cause the illumination of the Service pilot light 152, along with a display of the actual number of hours elapsed thus far in the current service interval. The EPROM 122 may be programmed with a computer program that automatically turn on the service pilot light 152 after a predetermined number of elapsed hours has transpired since the last maintenance interval. The intervals may be set for 50, 250, 500, 1000 or 2000 hours, at which time various service actions are to be undertaken by maintenance personnel in accordance with schedules listed in the vehicle's maintenance manual. The total number of elapsed hours and other information may be stored in and retrieved from EEPROM 124 under appropriate command from microprocessor 110. When all aspects of the operation of the vehicle 20 being monitored by microcomputer 104 are satisfactory, the System Normal light 146 may be illuminated.

Interconnections To and Physical Construction of the Security Module

The status of the remote security module 18 may also be monitored by the microcomputer 104 by a signal delivered over signal path 216 leading to the input buffer 126. Coded control signals may be sent out from the output buffer 128 to the remote security module 18 over signal path 218. A synchronizing signal may also be sent to module 18 over signal path 220 along with the coded signal on path 218.

FIGS. 2 and 3 show a side elevational view and an end view respectively of the security module 18, fuel injector pump 23, and solenoid 25 mounted to the engine 22 of the loader/backhoe 20. A mounting bracket assembly 222 for the fuel injection pump 23 has a lower bracket section 224 attached to a side wall 226 of four-cylinder engine 22 by two bolts 227, and an upper bracket section 228 that extends upwardly and outwardly at approximately 45 degrees from side wall 226. Bracket sections 224 and 228 are separately formed and are adjustably joined by conventional fasteners such as pin and bolt arrangement (not shown) to allow for adjustment of fuel injection timing. The fuel injection pump 23 has a stubby cylindrical body with flared fittings 230 provided at four uniformly separated locations along the periphery of the body of pump 23. Conventional fuel lines (not shown) leading to the individual fuel injectors (not shown) are connected to the fittings 230. The four additional fittings 232 located at right angles to fittings 230 are test port fittings. One such fuel injection pump is the CAV distributor-type pump available from Lucas Industries, Inc. of Greenville, S.C. The fuel pump 23 is provided with an internal normally-closed fuel shut-off valve 24 which is actuated electrically by a cylindrically-shaped 12-volt DC solenoid represented by solenoid 25 in FIGS. 2 and 3. The solenoid 25 is mounted on the body of pump 23 and extends radially outwardly from the center of the pump between two of the fittings 230.

The tamper-resistant housing 26 of security module 18 is comprised of two half sections 234 and 236 which may be provided with flanges and/or bends in various locations to provide the sections with greater strength where necessary or desirable. The exact design of and materials used to form the housing sections is not deemed to be of any particular significance to the present invention so long as the overall housing 26 has reasonable structural integrity and strength so as to thwart efforts to gain physical access to the solenoid 25 or electronics enclosed within the housing 26, except by such vigorous effort that the electronics and solenoid would be rendered inoperative due to physical damage. In one embodiment of the security module 18, the housing sections 234 and 236, made from zinc-plated 18-gauge cold-drawn sheet metal stock, are riveted together and respectively have complementary support arms 238 and 240 extending therefrom as shown in FIGS. 2, 2A and 3 to capture upper mounting bracket section 228 therebetween. Two clinch nuts 242, such as nut No. S-0420-0 from Penn Engineering & Manufacturing Corp. of Danboro, Pa., are permanently fastened to support arm 240. Two round-head security screws 244, each with breakaway hex-head portion 246, such as screw No. 91243A537 from McMaster-Carr Supply Co. of Chicago, Ill., are passed through matching holes in the support arm 238 and upper bracket section 228, threaded into the clinch nuts 242, and tightened down until the break-away head portion of each screw snaps off in the necked-down region 248, shown in FIG. 2A. Thereafter, the only practical way to remove the screws without destroying the module 18 is by drilling them out. In order to have room to do this, the pump 23 has to be removed from the engine 22. This effectively prevents housing 26 from being disassembled once it has been bolted together with nuts 242 and screws 244, which helps make the security module 18 of the present invention tamper-resistant.

The module 18 includes a flexible cable assembly 250 extending from housing section 234 which includes a conventional water-and-oil-resistant cable and sheathing 252 and a conventional five-pin connector 254, which connects to a complementary connector cable assembly (not shown) whose wires run to the master control module 16. The solenoid 25 is positioned within the housing section 236, as best seen in FIG. 2. The electronics for the security module 18 are located on one or two printed circuit boards 256 shown in phantom in FIG. 2, which are inserted into section 234 and fastened to internal flanges therein. The electrical connection to the solenoid 25 is made by an insulated wire (not shown) connected between an output terminal on one of PC boards 256 and the screw 258 provided on the end of solenoid 25. A conventional electrical potting compound may be used to encapsulate the PC boards if desired. A conventional ground strap or conductor 260 may be provided to ground the metallic housing 26 to grounded bracket 228 in order to provide a field shield to block electromagnetic noise which may be generated by nearby high-energy electrical equipment such as the alternator.

General Sequence of Operation of Security System

The operation of the security system 14 and how it helps prevent unauthorized operation of the vehicle 20 will now be qualitatively described. The master control module 16 is preferably formed as part of a deluxe instrument cluster 100. The second part of the security system 14 is comprised of the security module 18 mounted directly adjacent and shrouding the solenoid 25 of the fuel injector pump 24. The master module 16 including operator interface 106 is capable of operating with two different versions of the security module 18, namely an analog version 18a and a digital version 18d, the circuits of which are respectively shown in FIGS. 4 and 5. When description of the security module 18 is given herein within the "a" or "d" suffix, such description applies to both versions of the module 18.

In order to operate the vehicle 20, the security system 14 must be disarmed. To do this, a first access code known ony to authorized operators of the vehicle 20 must be entered via the keypad 140. When the sequence of entered keystrokes matches the first access code stored within the memory of the microcomputer 104, the master module 16 automatically generates and transmits to the security module 18 a special signal encoded with a second and different access code unknown to the operator of the vehicle. When module 18 determines that the received signal is coded with the second access code stored within its memory, a solid-state switch within module 18 is energized, thereby providing electrical power to the electrically-operated actuator, i.e., solenoid 25, so that the vehicle 20 may be moved. The second access code contained in the signal transmitted between the modules 16 and 18 may be an analog signal encoded by using a special voltage, frequency or waveform or a digital signal encoded with a multi-bit code. To further improve security, the master module is arranged to allow the first access code stored therein to be reprogrammed when a special sequence of keystrokes is entered.

A preferred implementation for the above-described operation will now be explained in detail. The below-described sequence of operation is achieved in part by the programming of microcomputer 104 by a suitable program stored in read-only memory 122. The preparation of the computer program necessary to operate the microcomputer 104 in accordance with the description herein is well within those skilled in the microcomputer art, and thus need not be described here.

The security system 14 has four major states or modes: the wait mode, the decode mode, the operate mode, and the secure mode. The wait mode is a wait state during which the system 14 is waiting for the operator to push the buttons of the keypad 142 to enter a different mode. The decode mode is the mode during which the procedures required to disarm the security system are carried out. The operate mode is the disarmed state of the security system, and the secure mode is the mode during which the first access code and the supervisory code may be changed. Those skilled in the art should appreciate that the particular sequence of buttons of keypad 142 to be pushed to carry out the various functions performed in the different modes described below are a matter of design choice. Other sequences of keystrokes could just as easily be used by suitable programming of the microcomputer 104.

When the ignition key 132 of the vehicle 20 is first turned on, the microcomputer 104 goes through a conventional power-up diagnostic routine to verify that all of its internal functions are working and then enters the wait mode as it waits for the vehicle operator to push an appropriate key or keys indicating the decode mode or secure mode is to be entered. The security system 14 can only reach the operate mode by successfully completing all of the required steps in the decode mode. To enter the decode mode, the DEC switch 142-7 is pressed. The LED display 184 will show a "----". The operator then enters a multiple-digit user code by pushing the appropriate keys 142 on keypad 140. The user code should include at least three, and preferably includes four, digits or keystrokes (or more). If the entered user code matches the first access code stored in EEPROM 124, the microcomputer 104 enters the decode mode. If the entered number does not match the stored first access code, the audible alarm 134 sounds for a predetermined period of time, such as three seconds, and the display 184 simultaneously show "----". After three seconds, the operator may make an another attempt to enter his user code. If this second attempt is unsuccessful, the alarm 134 sounds and the Security pilot light 150 flashes continuously, until power is removed from the master module 16 by turning the ignition key 132 to its Off position.

Once the security system 14 has entered the decode mode, a coded signal is sent from the master module 16 to the security module 18 via signal path 218. Module 18 examines the received signal to determine if it is encoded with the proper information, namely the second access code. If the coded signal contains the same access code stored within the module 18, a power switch within the module 18 is energized, so that normal supply voltage, such as 12 volts DC, is applied to the solenoid 25 of the fuel shut-off valve 24. If the correct second access code is not received, the security module either will do nothing or preferably will latch up a memory or device therein, thereby ignoring further attempts of the master control module 16 to send coded signals containing the proper second access code until power is removed from the security module 18 for a predetermined period of time.

The secure mode is provided to allow the owner or authorized supervisor of vehicle 20 to change the user code, that is the first access code. This mode is entered by pressing the C switch 142-11 when the ignition key 132 is in its On position and the engine 22 is off. When the secure mode is first entered, the LED display 184 shows "ProG". The C switch 142-11 is then pressed again, and the display 184 shows "----". Next, the supervisor enters the six-digit supervisory code or number, which is also sometimes called the security module ID number. This code or number is known only to those individuals authorized to change the user code number. The display 184 show only the most recently entered number in the rightmost digit. This is done to avoid diplaying any more of the number at one time than is necessary in order to enable the supervisor to verify that the microcomputer 104 has in fact correctly perceived the keystroke just entered. Once six digits have been entered, the microprocessor 110 then compares the entered supervisory code with the supervisory code or number stored in the EEPROM 124. If the entered number does not match the stored number, alarm 134 sounds, and light 150 flashes continuously until power is removed from instrument cluster 100 by turning ignition switch 132 to its Off position. If the numbers do match, "ProG" will appear upon display 184.

Next, the supervisor must press the Security switch 142-4, and the system 14 will respond by showing "----" in display 184. Thereafter, the first digit of the new user code number is entered, and the display 184 will show "---X" where X represents any digit which was entered. The supervisor then enters the second, third and fourth digits of the new user code number, and the numbers are shifted to the left in display 184 as they are entered. To store the sequence, the Decode switch 142-7 is pushed. The display 184 then shows "ProG". If a different sequence is desired, the supervisor may push the Security switch 142-4 and begin entering the new user decode number again.

To change the supervisory code, the supervisor presses the C switch 142-11 and turns the ignition key 132 to its Start position. The display 184 then shows "ProG". Then the supervisor pushes the C switch 142-11, and the display shows "----". Next, the current six-digit supervisory number is entered. As before, the display 184 only shows the most recently entered number in the rightmost location. If the number entered does not match the stored supervisory number, the alarm 134 sounds, and light 150 flashes until power is removed from the instrument cluster 100. If the numbers do match, "ProG" will be displayed.

Next, the supervisor presses the "1" and "0" switches 142-1 and 142-0 simultaneously for three seconds. Thereafter, the display 184 will show "----". The supervisor then enters the first digit, and the display 184 shows "---X", where X is any digit that was entered. Then the second through sixth digits are entered in sequence, and the numbers are shifted to the left as they are entered. To store the entered sequence, the Decode switch 142-7 is pressed. The microcomputer 104 then responds by showing "ProG" on the display 184. If a different sequence of numbers is desired, the supervisor may press switches 142-1 and 142-0 for three seconds and begin by entering a new supervisory code again.

On occasion, it may be desirable to operate the vehicle 20 without requiring the user to enter any access codes at all, such as when the vehicle is being used at a facility where only authorized users have access to it. This can be accomplished by changing the first access code to "0000" or by storing a supervisory number of "000000". When either of these codes are present in the memory of master module 16, the security system operates as though it is locked into the operate mode and automatically sends the necessary second access code via coded signal to the security module 18 during the power-up diagnostic routine. When the supervisory number is "000000", the security system is locked in the aforementioned operate mode and cannot be switched into the secure mode, except by reprogramming EEPROM 124.

The Analog Security Module—Circuitry and Operation

The analog security module 18a is provided with circuitry which can determine whether the proper second access code has been encoded into the signal transmitted from master module 16 to control module 18. Any suitable form of analog encoding may be employed. In other words, any predetermined analog identifying characteristic which may be added to, imposed upon or included with a communications signal sent between master module 16 and security module 18 can be utilized. For example, a predetermined frequency, a predetermined waveform or a predetermined voltage level outside of the normal vehicle voltage supply range may be utilized. Or, as shown in FIG. 4, a predetermined voltage level between a supply voltage level, such as +12 volts DC, and ground (i.e., zero volts DC) may be utilized. Also, more than one such characteristic may be used together as the correct access code. The presence of the correct predetermined identifying characteristic or characteristics in the coded signal may be remembered once they are received using a memory means, in the security module 18. Alternatively, the security system 14 can be arranged so as to require that the coded signal be delivered continuously, as is done in the FIG. 4 circuit, or at predetermined intervals, to keep the electrical power switch of the security module 18a on.

The circuit 270 shown in FIG. 4 is one possible practical embodiment of analog module 18a. Circuit 270 may be constructed on a single circuit board having five external connections, namely terminals 272 and 273 for +12 volt DC and 0 volt DC power connections, coded signal input terminal 274, control output terminal 275 and status output terminal 276. Output terminal 275 is connected to the solenoid 25 of fuel shut-off valve 24. The circuit 270 has two major sections, comparator section 280 and power switching section 282. A signal-conditioning section 284 buffers and scales the input signal before it is applied via conductor 286 to section 280. Circuitry sections 288 and 290 provide supply over-voltage protection and output over-current protection, and thus do not participate in the operation of the circuit unless such abnormal conditions occur. The particular values (i.e., resistance, reverse-bias breakdown voltages, size, etc.) for various elements and devices in circuit 270 are dependent upon the amount of current drawn by solenoid 25 and by the components of the circuit elements themselves. Selection of appropriate values and particular brands of the circuit devices is a routine design choice well within the abilities of those of ordinary skill in the art, and this need not be discussed here.

Many components in circuit 270 are provided to harden the operating portions 280 and 282 of the circuit 270 against the harsh electrical environment found in off-road vehicles. For example diode D1 protects against the supply voltage terminals 272 and 273 being connected backwards. Varistor D1 helps attenuate high-voltage transients. Capacitors C3–C5, C7, C9–C14 and C16 provide high-frequency noise suppression. Diodes D3 and D4 protect the inputs of conventional operational amplifiers U1A and U1B from severe over-voltage conditions. Diodes D9 and D10 connected to power transistor Q4 in the output section 282 similarly protect transistor Q4 from extreme over-voltage conditions generated by solenoid 25. Zener diode D5 acts as a voltage clamp to protect the gate of field effect transistor Q1 from over-voltage conditions.

Input signal-conditioning section 284 includes a low-pass RC filter circuit formed by resistor R2 and capacitor C2 so that the voltage on buffered input line 286 does not change too rapidly. Resistors R2 and R4 form a voltage divider network which causes the filtered voltage level on line 286 to be a predetermined fraction (such as one-half) of the average voltage level on input terminal 274.

Comparator section 280 includes a regulated power supply, formed by zener diode D2 and resistor R1 and capacitor C1, that holds the voltage on line 294 at about Vcc volts, where Vcc is a specific selected voltage between 4.0 and 9.0 volts DC. Resistors R3, R5 and R6 are connected in series and form a voltage divider network which provides at nodes 296 and 298 voltages of Vaa volts DC and Vbb volts DC respectively, where $Vaa = Vcc*(R5+R6)/(R3+R5+R6)$ and $Vbb = Vcc*R6/(R3+R5+R6)$. Large capacitor C15 filters out any AC component present on DC supply line 294 and helps stabilize the voltage levels at nodes 296 and 298. Node 296 is directly connected to the positive input of op-amp U1A, while node 298 is connected to the negative input of op-amp U1B. The conditioned input signal on line 286 is connected to the negative input of op-amp U1A and the positive input of op-amp U1B. The two op-amps are effectively arranged in open collector configuration, since resistors R17 and R18 are of such high value relative to the input resistance of signal-conditioning section 284. The op-amps U1A and U1B are used as analog voltage comparators. When the voltage on line 286 is above Vaa volts, op-amp U1A turns on. When the voltage on line 286 is below Vbb volts, op-amp U1B turns on. When either op-amp is turned on, output line 300 is dragged low, to zero volts. Only when the input voltage on line 286 is between Vaa volts and Vbb volts are both op-amps U1A and U1B off, thus allowing output line 300 to float high on account of current supplied through pull-up resistor R7. The floating voltage on line 300 is limited to about 6.2 volts by action of zener diode D5. The voltage divider network formed by resistors R2 and R4 divides the raw input voltage Vii on terminal 274 in accordance with the resistance formula $k = R2/(R2+R4)$. Thus, it will be readily understood that the voltage level Vii required at input terminal 274 in order to produce a positive voltage on output line 300 between Vaa/k volts DC and Vbb/k volts DC.

Thus, if for example the values of Vcc, R3, R5 and R6 are selected so that Vaa and Vbb are 0.6 volts and 0.5 volts respectively, and the resistances of R2 and R4 are equal so that k=0.5, then the voltage level or range required at input 274 to produce a positive output on line 300 is $(Vaa + Vbb)/2k = 1.1$ volts DC (plus or minus 0.1 volts DC).

When the output line 300 of comparator section 280 is low, n-channel field effect transistor Q1 is non-conducting or off, which presents current from flowing out of the base of pnp power transistor Q4. Reverse-biased diode D9 blocks the other path for dragging the base of transistor Q4 low. When the output 300 of section 280 is high, transistor Q1 turns on, thus allowing current to be conducted away from the base of transistor Q4, which turns transistor Q4 on. When transistor Q4 is on, current flows through shunt resistor R13, transistor Q4 and control output terminal 275 to solenoid 25. Transistor Q4 will conduct and solenoid 25 will remain energized as long as the coded signal on line 218 remains at approximately (Vaa+Vbb)/2k volts DC. The status output terminal 276 is provided so that the master module 16 can monitor the operation of power transistor Q4. When transistor Q1 is on, the status output is low, indicating that transistor Q4 should be on. When the status output 276 is in a high impedance condition, this indicates that the transistor Q1 is off, so that transistor Q4 should also be off.

Protective circuit 288 includes zener diode D12 having a reversebiased breakdown voltage of 18 volts. When the supply voltage from terminal 272 rises to approximately 18 volts, diode D12 begins conducting in reverse. This turns npn transistor Q5 on which pulls output line 300 low turning off transistors Q1 and Q4 independent of the state of input terminal 274. This is done to prevent severe overvoltage conditions from damaging power transistor Q4 or the solenoid 25.

Protective circuit 290 ensures that power transistor Q4 is not overheated or burned out by excessive current drawn through output terminal 275. The current through transistor Q4 is monitored by the voltage drop across shunt resistor R13. When this voltage drop becomes excessive, indicating excessive current, pnp transistor Q2 begins to conduct, thus providing current to node 306 which allows the time delay network formed of resistor R8 and capacitor C8 to operate. If the overcurrent condition lasts long enough or is severe enough, the voltage on capacitor C8 rises to the point where n-channel field effect transistor Q3 turns on, thus pulling line 308 low, and when line 308 is low, diode D13 conducts, thus dragging line 300 low independent of the status of input 274, which turns transistors Q1 and Q4 and the solenoid 25 off. Once transistor Q3 is on, current flows through resistor R11, maintaining transistor Q2 on until the supply voltage on terminal 272 approaches zero volts.

The Digital Security Module—Circuitry and Operation

Figure 5A:
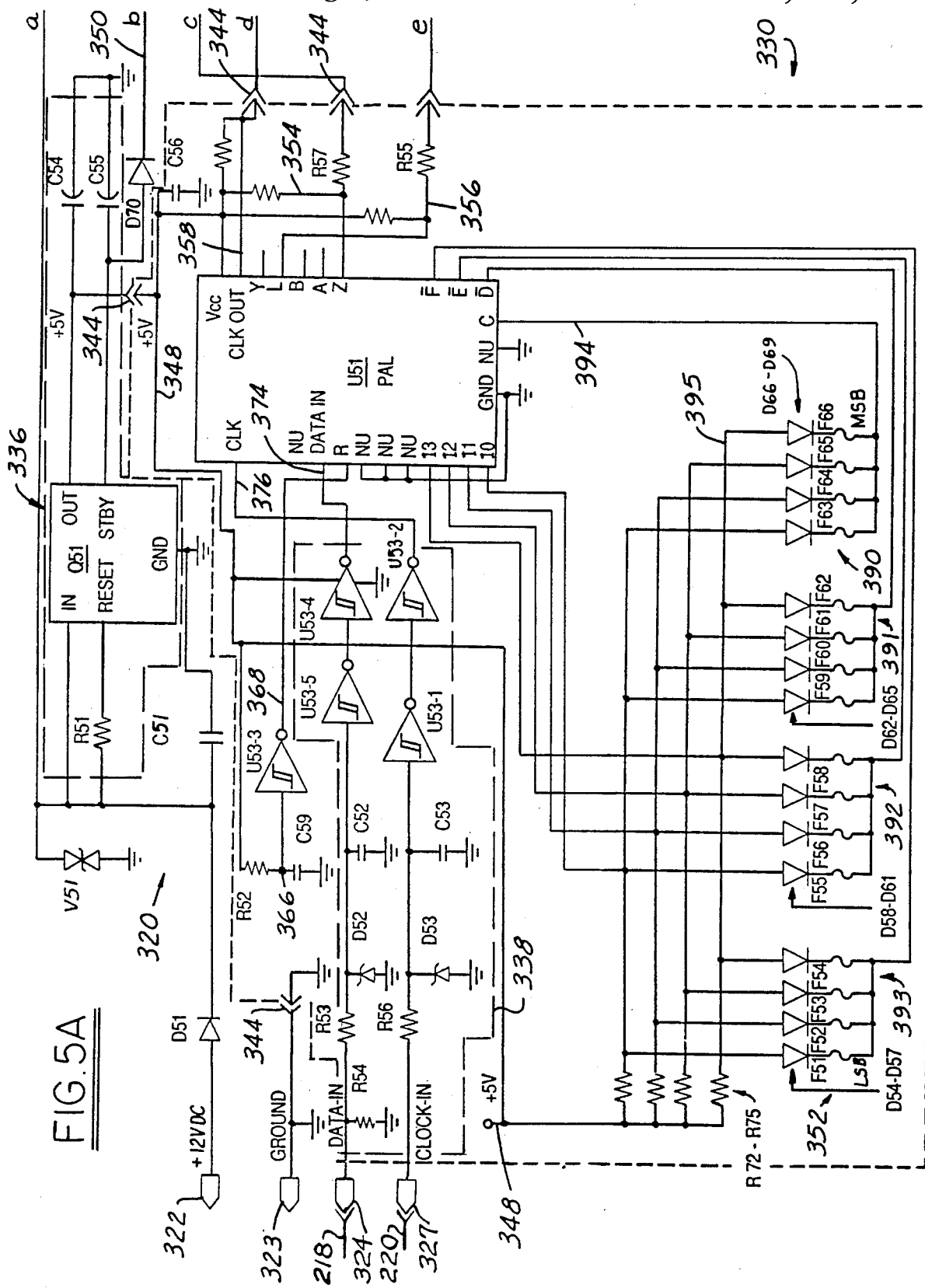
FIGS. 5A and 5B are the left and right halves respectively of a schematic diagram which together show the electronic circuit used within the presently preferred digital security module that requires a specific digitally-encoded access signal to energize its output.
Figure 5B:
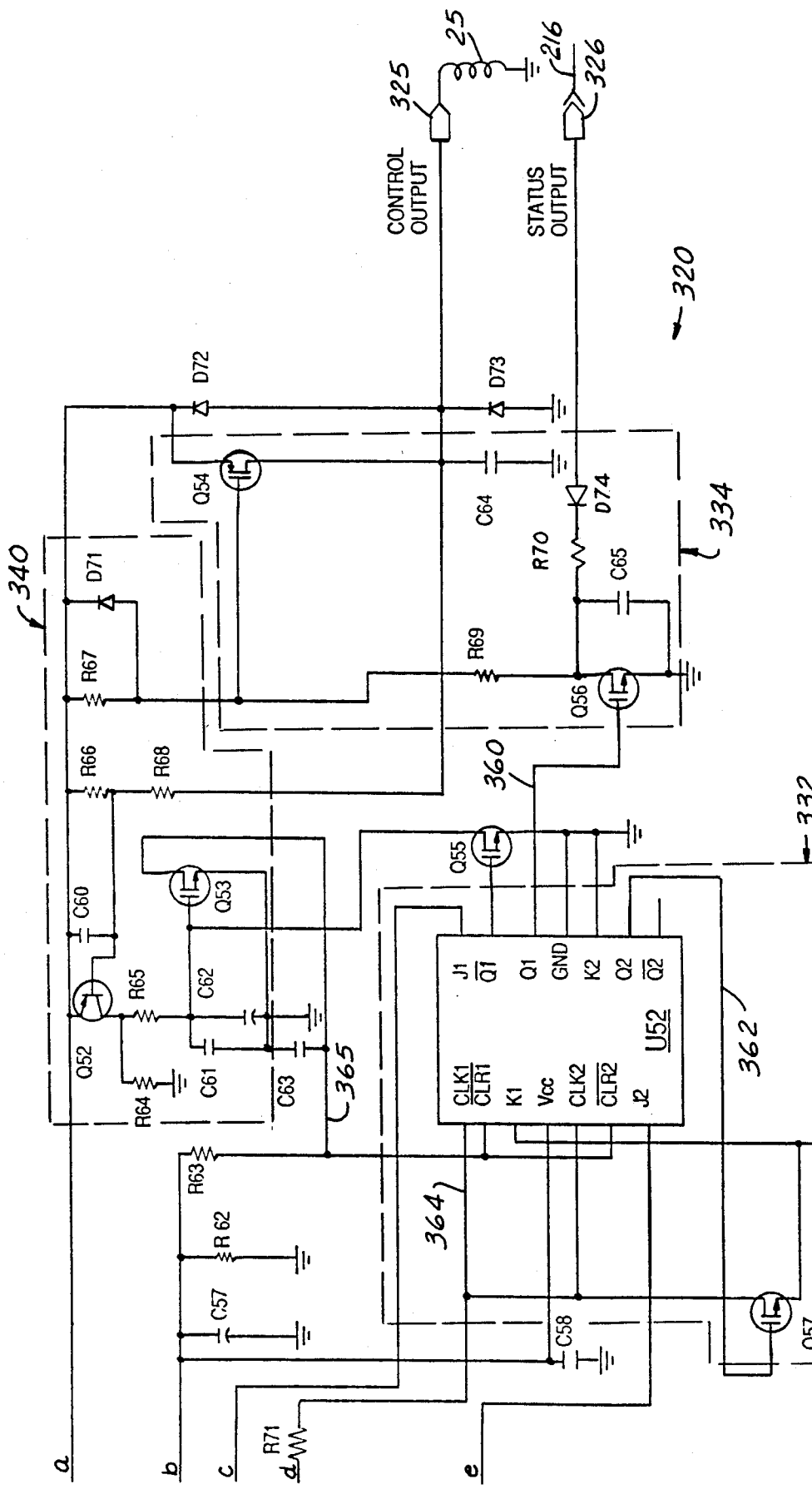

FIGS. 5A and 5B are a schematic diagram of a presently preferred circuit 320 for the digital security module 18d. Circuit 320 has six external connections, namely supply voltage and ground terminals 322 and 323, an input terminal 324 for receiving the coded signal over conductor 218 from master module 16, a control output terminal 325 connected to the solenoid 25 of the fuel shut-off valve 24, a status output terminal 326, and a clock input terminal 327. The circuit 320 has three major sections, namely decoder or compartor section 330, status memory section 332 and power switching section 334. Other sections of circuit 320 include the power supply section 336, the input signal conditioning or buffer section 338, and an over-current protection section 340. In the present embodiment of the digital security module 18d, circuit 320 is fabricated from discrete components as shown. Due to space limitations within the housing 26, the components of circuit 320 are mounted onto two separate printed circuit (PC) boards. The first PC board contains the comparator section 330 and the input signal buffer section 338, while the remainder of the circuit 320 is on the second board. The two circuit boards are interconnected by a conventional five-pin connector 344. Those in the art will appreciate that circuits equivalent to major portions of circuits 270 and 320 of FIGS. 4 and 5 could be implemented in other ways, such as in a custom-designed integrated circuit chip or by using a dedicated microprocessor and a power switching section, if desired.

Table 1 below gives manufacturers and part numbers for the selected integrated circuit chips used in circuit 320 of FIG. 5. The specification of the values. The specification of the values and sizes of the remaining components in FIG. 5 is a matter of routine design choice well within the abilities of those of ordinary skill in the art, and need not be discussed here.

TABLE 1

| Ref No. | Description | Manufacturer | Part No. |
| --- | --- | --- | --- |
| D54-D69 | Diodes | Motorola | MBR030 |
| Q51 | Voltage Reg. | National Semiconductor | LM2935T |
| U51 | PAL | Advanced Micro Devices | P22V10 |
| U52 | Dual Flip-Flop | Motorola | MM54HC73 |
| U53 | Schmitt Trigger | Motorola | MM54HC14J |

A significant portion of the components in circuit 320 are included in order to harden the operating portions of the circuit against the harsh electrical environment present in off-road vehicles. For example, diode D51 connected to supply terminal 322 protects against a reverse voltage connection of power to the module 18d. Varistor V51 and protection section 340 help eliminate damaging effects that may otherwise be caused by transient over-voltage conditions. Small capacitors C51-C53, C56, C58, and C60-C65 suppress high-frequency transients. Zener diodes D52 and D53 respectively protect Schmitt trigger devices U53-1 and U53-5 from over-voltage conditions on input lines 324 and 327. Zener diode D71 protects the gate of field effect transistor Q54 against supply over-voltage conditions. The power supply section 336 converts part of the +12-volt DC electrical power supplied through terminal 322 into a regulated +5-volt DC voltage source on line 348, which powers all of the active signalconditioning and logic devices in circuit 320. Part of this power passes through diode D70 to line 350 to power memory status section 322.

Before describing the operation of decoding section 330 and memory status section 322 in detail, it is useful to review the overall function of circuit 320. A synchronous multi-bit data input signal from master control module 16 sent over line 218 is received on data input terminal 324 and is clocked into the programmable logic device U51 by the clock signal arriving over line 220 and received by terminal 327 that is simultaneously transmitted by master control module 16. The device U51 is preferably a programmable array logic (PAL) integrated circuit chip, which will be further described shortly. Device U51 compares the second access code encoded in the data input signal on line 324 with the second access code stored in a non-volatile memory bank 352 comprised of selectively blown fuses F51-F66. If the received access code matches the stored access code, output Z of device U51 connected to line 354 goes high. When the received number does not match the stored or pre-programmed number, output L of device U51 connected to line 356 goes high.

The next clock pulse makes the clock output of device U51 and line 358 go high, thus causing the first of two flip-flops in device U52 of status memory section 332 to be turned on. When the first flip-flop of device U52 is turned on, output line 360 goes high. When the second flip-flop of device U52 goes high, output line 362 goes high, which turns on n-channel field effect transistor Q57, which drags clock input line 364 low. This prevents the flip-flops of chip U52 from changing state again until power is removed from the module 18d. When output line 360 is high, n-channel field effect transistor Q56 is conducting, which allows the gate of p-channel power field effect transistor Q54 to be biased so as to turn transistor Q54 on. This causes transistor Q54 to conduct, thus providing current to output terminal 325 which energizes solenoid 25.

The amount of current passing through transistor Q54 is monitored by the over-current protection section 340 via the resistor network formed by resistors R66 and R68. When the current through transistor Q54 becomes excessive, the voltage drop across resistor R66 is sufficiently great to cause transistor Q52 to begin to conduct in an amount proportional to the amount of over-current. If this over-current condition lasts long enough, capacitor C62 is charged through resistor R65 to a voltage level sufficiently high to cause n-channel field effect transistor Q53 to conduct, which discharges line 365, resetting the flip-flops in chip U52. When the first flip-flop in chip U52 is reset, the output 360 goes low, and as a result solenoid 25 is de-energized.

The operation of decoder section 330 will now be described in detail with the help of FIGS. 6 through 8. The PAL device U51 is preferably a Model No. P22V10 chip from Advanced Micro Devices, Inc. of Sunnyvale, Calif. The general operation of programmable logic devices such as PAL U51 is described in detail in *Advanced Micro Devices Programmable Logic Handbook/Data Book*, pp. 1-1 through 1-53 (1986). Examples of logic designs implemented with PAL devices are also given in this handbook. Also, Application Note AN17, *Signetics Programmable Logic Data Manual*, pp. 9-107 through 9-109 (January 1986), describes an electronic combination lock implemented using a Signetics PAL which may be opened or unlocked by providing correct numbers that match a preset security code stored in a bank of DIP switches therein. In the electronic lock, a binary encoded rotary switch provides four bits of information simultaneously to the Signetics PAL which is programmed in accordance with a table in the application note. As the handbook and application note illustrate, the programming of programmable logic devices, such as PAL device U51, is well-understood by those in the art. Accordingly, it is sufficient herein to simply further explain by a state diagram illustrated in FIG. 7 and logic circuitry illustrated in FIG. 8 how PAL U51 operates. Armed with the description herein, those skilled in the art can readily prepare the necessary program for PAL device U51, using commercially available software design packages for PALs, if desired to expedite this process. In PAL device U51, five inputs, namely 10, 11, 12, 13 and Data In, and eight internal flip-flops A, B, C, D, E, F, L and Z are utilized. True outputs from flip-flops C, L and Z and inverted outputs of flip-flops D, E and F within the PAL are used to drive other parts of circuit 320.

The timing diagram shown in FIG. 6 shows the timing relationship between the data input signal received on terminal 324 and the clock input signal received on terminal 327. Data signal 324 is sharpened up and inverted by Schmitt trigger U53-5 and restored to its original polarity by Schmitt trigger U53-4 before being input into the Data In pin of PAL device U51. The clock input signal 327 is similarly conditioned by inverting Schmitt triggers U53-1 and U53-2 before being delivered to the CLK input pin of PAL device U51. Table 2 below defines the symbols used to identify the various time periods shown in the waveforms of FIG. 6 and provides suggested minimum values for those time periods. As those skilled in the art will appreciate, the time periods may be considerably longer than the minimum times indicated, as long as the relative relationships shown in FIG. 6 between the various intervals of time are maintained.

TABLE 2

| Symbol | Description | Min. Time Value (in microseconds) |
|---|---|---|
| $t_{ss}$ | Time From Turn-On of Supply Voltage To Rising Edge of First Clock Pulse | 50,000 |
| $t_s$ | Data Input Set-Up Time | 300 |
| $t_h$ | Data Input Hold Time | 100 |
| $t_w$ | Clock High Time | 500 |
| $t_x$ | Clock Low Time | 500 |

When power is first applied to the circuit 320 at time t0, the power supply section 336 charges up capacitors C54 and C55 and thereafter a stable +5-volt DC supply of power is then available on line 344. As line 344 ramps up to 5 volts, capacitor C9 is charging relatively slowly through the high-resistance resistor R52. When the voltage at line 366 is sufficiently high, the output 368 of Schmitt trigger U53-3, which was high and held PAL device U51 in a reset state, switches to a low logic level, thus allowing the PAL to operate. The time $t_{ss}$ shown on FIG. 6 is somewhat longer than the time required to make line 368 go low after power is applied at time t0 to security module 18d. Waveforms 370 and 372 illustrate both possible logic states for the digital input signal provided on terminal 324. As shown in FIG. 6, a certain minimum time $t_s$ is required as data input set-up time before the arrival of the first clock pulse at t1. This ensures that the data input signal provided on line 218 has time to propagate through the devices R53, C52, U53-5 and U53-4 and stabilize before the rising edge 375 of the first clock pulse is provided via line 376 to the CLK input of the PAL, which causes the PAL to progress to its next logic state, as will be further explained via FIG. 7. The security code encrypted in the coded signal received on terminal 324 is decoded by PAL U51 in the first sixteen clock pulses received by terminal 327. The seventeenth and eighteenth clock pulses are used in the internal circuits of the PAL U51 to generate state transitions which alters outputs on pins L and Z that are required to turn on and latch up the flip-flops of device U52. The first clock pulse clocks the most significant bit of the 16-bit second access code into the Data In pin of the PAL.

The correct access code for a given security module 18d is programmed into the fuse bank 352 by selectively blowing fuses therein. The fuses F51 through F66 may be individually formed by narrowing a portion of a metal trace provided on the printed circuit board or by a small surface-mounted fuse link or like element. Alternatively, wire jumpers could be selectively installed rather than selectively blowing fuse links. The code is set or programmed into the fuse bank prior to the insertion of the integrated circuits into the PC boards by providing a temporary current overload to burn out the fuse link. Since there are sixteen fuses, there are $2^{16}$ or 65,536 possible combinations. The fuse bank 352 is divided into four groups 390-393 of four fuses each. Group 390 is read first and group 393 read last. Fuse F66 and F50 represent the most significant bit and least significant bit respectively of the second access code stored in memory bank 352. The state of the fuses in each group is read when the common line, such as line 394 of group 390, is pulled low. If the input line, such as line 395 connected to input pin I3, remains high, it indicates that the associated fuse, such as fuses F66, is blown, which represents a logic "1" state. If the input line goes low, it indicates the fuse is intact, which represents a logic "0" state. Resistors R72-R75 are pull-up resistors which cause the input lines, such as line 395, to be high, unless pulled low through an intact fuse connected to a common line which is pulled low by one of the PAL outputs C,/D,/E or /F. (The slash immediately in front of the letters D, E and F indicates an inverted output.)

Figure 7:
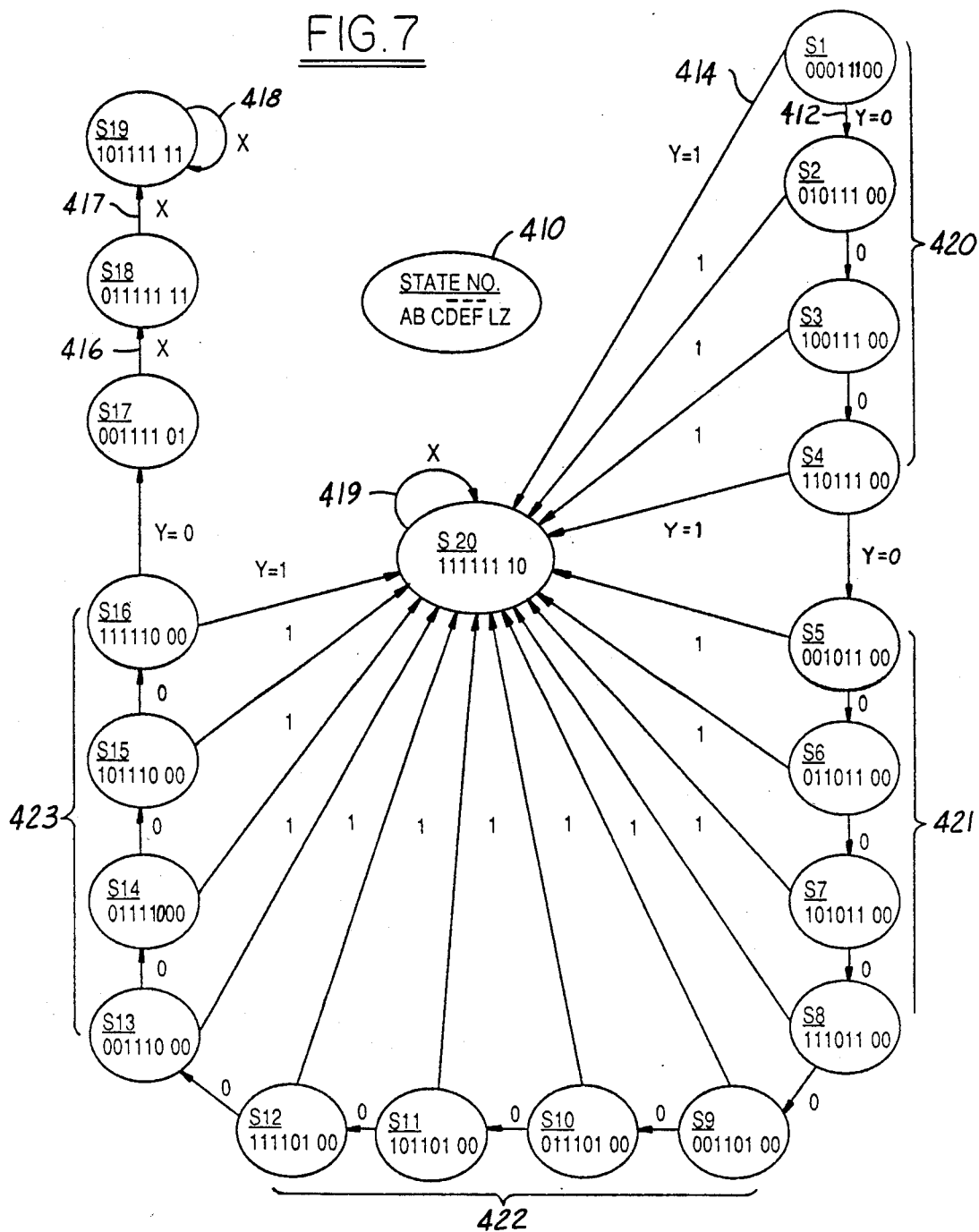
FIG. 7 is a state diagram to help explain further the internal logic operation of the programmed PAL IC chip and associated circuitry used in the FIG. 5 digital security module.

FIG. 7 is a state diagram depicting the twenty logic states S1-S20 of the PAL device U51 and the transitions between the various states. Within each oval representing a state is a bit pattern indicating the status of eight flip-flops A-F, L and Z within the PAL. Enlarged oval 410 gives a legend showing the order of the bit pattern representing the status of the various flip-flops for the states. The first state, which is also the reset state, is given in oval S1. Upon receipt of the first clock pulse, the programmed PAL U51 will either transition as indicated by line 412 to state S2 or by line 414 to state S20. Adjacent the transition lines 412 and 414 are the expressions "Y=1" and "Y=0" respectively, indicating the state of a combinationally determined variable Y which will be further explained by the logic diagram of FIG. 8. Thus, the value of Y during states S1 through S16 determines whether the current state will transition to the next higher-numbered state or will transition to state 20, as indicated in FIG. 7. As long as the value of Y is zero at the time of the receipt of the clock pulse during states 1 through 16, the PAL device U51 will transition to the next higher-numbered state. But if the value of Y is one when the clock pulse is received during any one of states S1 through S16, the PAL will transition to state 20. The transitions in states S17-S20 do not depend upon the value of Y, as indicated by the "X" next to the transition lines 416-419 between those states. The group 420 of the first four states S1-S4 are used to read the values encoded in the first group 390 of fuses F66, F65, F64 and F63 in that order or sequence. Similarly, the second group 421 of states S5 through S8 are used to decode the values programmed in fuses F62-F59 of fuse group 391 in sequence. Group 422 of states S9-S12 are used to decode the fuses F58-F55 of fuse group 392, while the fourth group 423 of states S13-S16 are used to decode the states of fuses of F4-F1 of fuse group 393.

Figure 8:
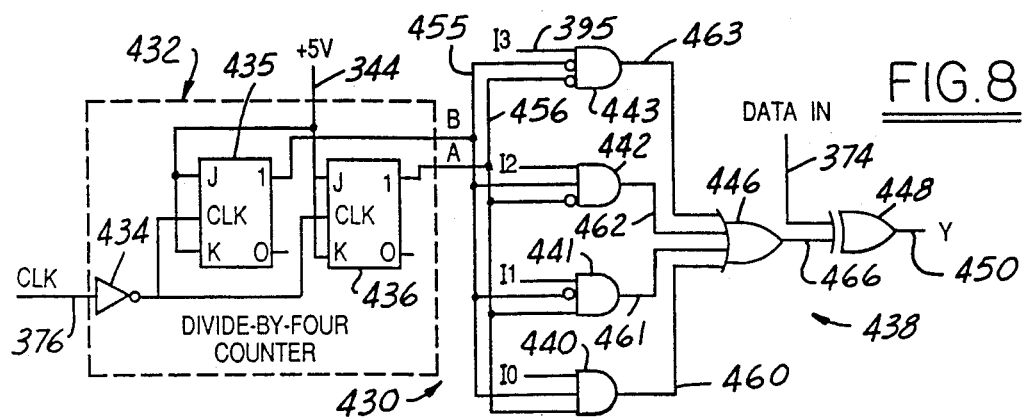
FIG. 8 is a schematic diagram of an exclusive OR decoder circuit implemented in the programmable array logic (PAL) integrated circuit (IC) chip of the FIG. 5 circuit; and Fiure 9 is a circuit diagram of part of the hydraulic system employed on the FIG. 1 vehicle, showing a directional control valve protected by a security module of the present invention.

FIG. 8 provides a simple logic circuit 430 which shows how the value of the variable Y is logically determined. Those in the art will appreciate that the actual implementation of circuit 430 within PAL device U51 is somewhat different, but will also realize the principles of logical operation thereof are essentially the same. Logic circuit 430 includes a divide-by-four counter 432 including an inverter 434 and clocked J-K flip-flops 435 and 436 and combinational logic circuit 438 including four AND gates 440-443, four input OR gate 446, and a two-input Exclusive OR gate 448. The inputs to logic circuit 430 are the input clock signal from line 376 and the buffered Data In signal on line 374 containing the encoded access code from master control module 16. The output 450 from the exclusive OR gate 448 is the variable Y, which is internally fed back into the PAL device U51 to participate in the transitions from state to state illustrated in FIG. 7.

The operation of logic circuit 430 may be briefly explained as follows. Initially, flip-flops 435 and 436 are reset so that their outputs on lines 455 and 456 are zero. Note that the true outputs of flip-flops 435 and 436 on lines 455 and 456 correspond to the outputs or pins B and A shown on the PAL U51 in FIG. 5A. When pins A and B are both zero, input 13 of the PAL is sampled by AND gate 443. When input I3 is high, output line 463 is high, thus causing the output 466 of Exclusive OR 446 to be high. If the input I3 is low, lines 463 and 466 will also be low. Lines 460 through 462 are also low because of the low values of lines 455 and 456. As long as the current logical state of the Data In signal from line 374 matches the logical state of line 466, the variable Y output on line 450 by Exclusive OR 448 will be zero. When the logic states of lines 374 and lines 466 do not match, that is, are different, the variable Y will have a logical one value, thus indicating that a bit of the received code on line 374 does not match the corresponding bit stored in fuse memory bank 352. In a similar manner, the logic circuit 430 will interrogate through inputs I2, I1 and I0 the status of respective fuses connected thereto when B and A, the true outputs of flip-flops 435 and 436, respectively have values of 01, 10, and 11. Referring now to Fiure 7, when the sixteenth clock pulse is received by PAL U51 and the variable Y has a value of zero, the PAL transitions to state S17, with pin Z of the PAL going high. This causes a logical one to be placed at the input pin J1 of dual flip-flop chip U52. When the seventeenth clock pulse arrives, line 358 connected to the Clock Out pin of the PAL goes high, thus providing a clock signal via line 364 to the CLK1 input of block U52, turning on the first flip-flop therein. This causes line 360 to go high, turning on transistor Q54, which provides power to solenoid 25. When the eighteenth clock pulse is received, line 356 connected to pin L of the PAL device U51 goes high, turning on the second flip-flop of device U52, which turns on transistor Q57.

As soon as a bit of the second access code incoming on terminal 324 fails to match the corresponding bit in the second access code stored in fuse bank 352, the PAL U51 transitions to state S20, which causes output pin L of the PAL to go high, so that the second flip-flop of chip U52 is turned on. When this happens, transistor Q57 is also turned on, so that line 360 cannot go high. To unlatch the second flip-flop of chip U52, the power must be removed from the security module 18d long enough to allow capacitor C57 to discharge through resistor R52 and CMOS chip U52. The resistance of resistor R52 is intentionally quite high, so that capacitor C57 takes longer than two seconds to discharge sufficiently to cause the second flip-flop of chip U52 to unlatch. This helps prevent a thief from relatively quickly defeating security module 18 by using a specially-designed electronic circuit that sequentially tries every possible combination of 16 binary bits at a high rate of speed.

Those skilled in the art will appreciate that circuits similar to comparator section 330 shown in FIG. 5a may be constructed with the capability of decoding a coded signal containing a fewer number of bits or a greater number of bits. Similarly, those in the art will appreciate that other hard-wired circuits may be used to accomplish this decoding task or that a simple microprocessor having a read-only memory for storage of the second stored access code and program code may be employed in place of circuit sections 330 and 332 shown in FIG. 5.

Protecting Other Electrically-Operated Actuators

In the preferred embodiments described thus far, the electrically-operated actuator being controlled by the security module 18 is a solenoid 25 that opens the fuel shut-off valve 24 shown in FIG. 1. It should be appreciated that other electrically-operated actuators could be protected by security module 18. FIG. 9 is a schematic diagram of a hydraulic circuit 460 associated with the hydraulic directional valve 86 shown in FIG. 1, which is operatd by solenoid actuators 88 and 90. The security module 18 could be used in conjunction with this valve, instead of the fuel shut-off valve 24, if desired, as will now be further explained. Appropriate modifications or redesign of tamper-resistant housing 26 of security module 18, as suggested by housing outline 26, would allow the housing to enclose substantially all of or at least provide a barrier to prevent physical access to solenoid 90, so as to protect it from tampering. The hydraulic diagram of FIG. 9 shows the hydraulic cylinder 72 used to raise and lower the stabilizer 70 shown in FIG. 1. When the rod 462 of cylinder 72 is extended as shown, the stabilizer 70 extends outwardly and downwardly several feet from the vehicle and planted firmly on the ground, raising rear wheel 30 off of the ground. When stabilizer 70 and the stabilizer on the opposite side of the vehicle 20 are similarly extended, the rear wheels 30 are raised off of the ground, and the vehicle as a practical matter cannot be moved from its location. As is well known, the placement of stabilizers of construction equipment in their lowered condition is often utilized to help prevent theft, since the stabilizers must be raised before the vehicle can be moved any significant distance under its own power.

The hydraulic circuit 460 shown in FIG. 9 includes a manually operated, normally closed, spring-returned, two-position valve 464 operated by hand lever 60', the directional control valve 86, and a dual pilot-operated check valve unit 468. Flexible conduit connections such as steel braid-reinforced synthetic rubber hoses 470 and 472 are used to connect the check valve unit 468 to the hydraulic cylinder 72 as shown. Rod 462 of cylinder 72 may only be retracted when three conditions are simultaneously satisfied: hydraulic power supply unit 74 is operating to provide power to conduit 82, solenoid 90 is energized, and hand lever 60' is at least partially actuated. Since solenoid 90 must be energized through the circuitry 320 (or 270) of security module 18, the foregoing arrangement provides considerable protection against theft of the vehicle. If desired, the tamper-proof housing of the security module 18 may be enlarged as indicated by dashed lines 26" to enclose directional valve 86 and dual check valve unit 468. Such modification of the tamper-resistant housing to enclose solenoids or other electrical actuators such as motors is well within the skill of those in the art. Similarly, if solenoid 92 were an electrically-operated motorized valve actuator, the security module 18 of the present invention could still be employed to provide power to that motor only after it received a proper access code from the master module 16 over signal path 218. Based on the foregoing, it should be appreciated that the security module 18 alternatively can be used to control when other electrically-operated actuators on the vehicle 20 may be enabled. For example, a solenoid or electric motor 474 as shown in FIG. 1 associated with the transmission 80 of the vehicle 20 could be so protected.

Epilogue

While the foregoing detailed description has concerned an anti-theft security system used in conjunction with a loader/backhoe 20, those skilled in the art will appreciate that the teachings and security system of the present invention are equally applicable to other types of construction vehicles or agricultural vehicles. Therefore, as used herein, the term "off-road vehicle" includes any mobile vehicle which is principally used for agricultural or construction purposes. Such off-road vehicles include but are not limited to tractors, front-end loaders, backhoes, power shovels, dozers, road graders, scrapers and heavy-duty dump trucks.

Also, the term "characters" used in conjunction with the operator interface 106 or keypad 140 means any alphabetic, numeric or other symbolic characters recognizable by the human operators of a vehicle equipped with the security system of the present invention. The phrases "sequence of first signals" and "sequence of first characters" used in conjunction with the master control module or instrument cluster include specific combinations of characters (i.e., a specific set of characters presented in any order, having less than all possible characters in such set), as well as a specific set of characters presented in a predetermined order. The term "template" is intended as a generic term for any and all forms of providing for storage of information, including electronic, electrical, electromechanical and magnetic storage devices or circuits.

The foregoing detailed description shows that the preferred embodiments of the present invention are well-suited to fulfill the objects above-stated. It is recognized that those in the art may make various modifications or additions to the preferred embodiments chosen to illustrate the present invention without departing from the spirit and proper scope of the present invention, as illustrated by a number of such modifications described above. Further modifications are also possible. For example, the communications between the master control module 16 and the remote security module 18 may use optical or radio frequency signal paths, as well as the conventional electrical conductors. Thus, the term "line" and "conductor" used herein are intended to encompass optical guides for light signals, which may be in the visible or infrared ranges, and coaxial cable and the like, as well as conventional electrical wires including twisted pairs and shielded or unshielded conductors. Accordingly, it is to be understood that the protection sought and to be afforded hereby is the foregoing subject matter as defined by the appended claims, including all fair equivalents thereof.

We claim:

1. In an off-road vehicle anti-theft system which controls when at least one electrically-operated actuator on the vehicle may be operated, comprising:

a master control module including operator input means for entering a sequence of first signals from an operator of the vehicle, means for determining whether the entered sequence of first signals matches a first template in the master control module, and means of automatically generating a second signal for transmission to a remote location when the entered sequence of first signals matches the first template; and security module means, at a location remote from the master control module and directly adjacent to the one electrically-operated actuator for protecting the actuator against unauthorized operation, the security module means including signal input means for receiving the second signal from the master control module, means for determining whether the received second signal includes the first predetermined identifying characteristic;

the operator input means includes a keypad having a plurality of keys;

the sequence of first signals is a sequence of at least three keystrokes on the keypad;

the means for determining whether the entered sequence of first signals received form the operator includes memory means for storing a sequence of at least three characters corresponding to three predetermined keystrokes; and the means for automatically generating includes means for encoding at least eight bits of information in the second signal;

wherein the electrically-operated actuator is a device selected from the group of electrical devices employed on the vehicle consisting of solenoids and electric motors, and the portion of the vehicle is part of a vehicle subsystem selected from the group of vehicle subsystems consisting of the fuel delivery subsystem, the transmission control subsystem, and the control subsystem for a vehicle-stabilizing system including at least one deployable stabilizer, and wherein:

the means for providing an electrical signal to the actuator includes a solid-state power switching device; and, wherein the master control module also includes means for readily changing the first template without disassembly of the master control module and without replacement of components within the master control module, such that, after the first template is changed, a different sequence of first signals must be entered by the operator in order to match the first template.

2. A security system for preventing unauthorized movement of an off-road vehicle by controlling when at least one electrically-operated actuator on the vehicle may be operated, comprising:

an instrument cluster including (1) memory means for storing a sequence of characters representing a first access code known to an authorized vehicle operator, (2) keypad means for enabling the authorized vehicle operator to enter a first sequence of keystrokes corresponding to the first access code, (3) means for determining whether the entered sequence of keystrokes matches the first access code stored within the memory means, and (4) means for automatically generating, when the entered sequence of keystrokes matches the first access code, an electrical signal encoded with a second access code distinct from the first access code as part of enabling the operation of the actuator; and security means, located remotely from the instrument cluster and at the actuator, for protecting the actuator against unauthorized operation, the security means including (1) tamper-resistant housing means for obstructing physical access to at least part of the actuator, (2) memory means for storing the second access code within the security means, (3) signal input means for receiving the electrical signal from the instrument cluster, (4) means for determining whether the received electrical signal is encoded with the second access code, and (5) means for providing an electric signal to the actuator to operate the actuator when the received electrical signal is so encoded;

wherein a received electrical signal encoded with the second access code is an analog signal encoded with one distinctive identifying characteristic selected from the group of analog signal characteristics consisting of a predetermined voltage level intermediate a supply voltage level and ground, a predetermined frequency, and a predetermined waveform, and the means for determining of the security means includes electronic circuitry for recognizing the presence of at least the one distinctive identifying characteristics, and memory means for remembering, as long as electrical power continues to be supplied to the security module, the receipt of an electrical signal encoded with the second access code having that distinctive characteristic;

wherein the instrument cluster further includes (4) a microprocessor and the means for determining and the means for automatically generating are each implemented at least in part with the microprocessor, and (5) means for reprogramming the sequence of characters representing the first access code through at least in part the entering of a second sequence of keystrokes distinct of the first sequence of keystrokes, such that the first access code is changed;

the received electrical signal encoded with the second access code is a serial digital data signal encoded with at least eight bits of information; and wherein the memory means of the security means includes nonvolatile storage means for storing at least eight bits of information corresponding to the second access code, and the means for determining of the security means includes at least one programmable logic device programmed to sequence through a plurality of logic states as part of determining whether the bits of information encoded in the second access code of the electrical signal received from the instrument cluster match the bits of information corresponding to the second access code stored in the nonvolatile storage means of the memory means of the security means.

3. In a security system for an off-road vehicle, for preventing unauthorized movement of the vehicle by controlling when at least one electrically-operated actuator on the vehicle may be operated, a control module comprising:

barrier means located adjacent to at least one electrically-operated actuator on the vehicle, for deterring unauthorized physical access to the actuator;

means for receiving over a single line a code signal;

electronic means for determining whether the received coded signal includes a predetermined identifying characteristic whose presence in the received signal indicates that an authorized operator wishes to operate the actuator; and means for providing an electrical signal to the actuator when the received coded signal includes the first predetermined identifying characteristic;

wherein the electrically-operated actuator is a device selected from the group of electrical devices employed on a vehicle consisting of solenoids and motors, and the portion of the vehicle is part of a vehicle subsystem selected from the group of vehicle subsystems consisting of the fuel delivery subsystem, the transmission control subsystem, and the control subsystem for a vehicle-stabilizing system including at least one deployable stabilizer, and wherein:

the barrier means includes a tamper-resistant housing substantially enclosing the means for receiving, the means for determining and the means for providing;

wherein the coded signal is an electrical signal, the first predetermined identifying characteristic is selected from the group of analog signal characteristics consisting of a predetermined voltage level between a supply voltage level and ground, a predetermined frequency, and a predetermined waveform, and means for determining includes signal conditioning circuitry which removes transient electrical noise components from the receive coded signal before the received coded signal is analyzed to determine whether it includes the predetermined identifying characteristic; and wherein the coded signal is a serial digital signal encoded with at least eight bits of information, and the means for determining includes nonvolatile storage means for retaining digital access code information, and programmed logic means for sequencing through a plurality of logic states as part of determining whether the bits of information in the serial digital signal match digital access code information previously placed in the storage means.

4. In a security system for an off-road vehicle for preventing unauthorized movement of the vehicle by controlling when at least one electrically-operated actuator on the vehicle may be operated, a module for selectively enabling the electrically-operated actuator of the vehicle and responsive to a predetermined coded signal generated by another electric apparatus on the vehicle, the module comprising:

housing means obstructing physical access to at least part of the actuator so as to prevent unauthorized operation of the actuator; and electronic circuitry located within the housing means for controlling the operation of the module, the circuitry including (1) means for storing an access code value within the module; (2) means for receiving the coded signal over no more than two conductors; (3) means for determining whether the receiving coded signal is encoded with the access code value; and (4) means for providing an electrical signal to the actuator to operate the actuator when the received signal is encoded with access code value;

wherein the coded signal is a synchronous serial digital signal containing at least eight bits of information, and the electronic circuitry further comprises (5) means for receiving a clock signal along with the coded signal to permit clocked operation of at least part of the electronic circuitry; (6) means for remembering when means for determining has determined that the received signal is encoded with the access code value within the security module; and (7) means for disabling operation of the actuator at least until electrical power is removed from the control module;

wherein the electrically-operated actuator is a device selected from the group of electrical devices employed on a vehicle consisting of solenoids and motors, and wherein:

the means for storing includes nonvolatile storage means for retaining the access code value in binary form, and means for determining includes programmed logic means for sequencing through a plurality of logic states as part of the process for determining whether the received coded signal contains the access code value previously placed in the storage means; and wherein the housing means is of tamper-resistant construction and includes at least one fastener means which once fastened can only be unfastened by destruction thereof, the fastening means being located relative to the remainder of the housing means and module to deter unauthorized entry into the module once fastened.

* * * * *